J. B. ALLFREE.
VALVE GEAR.
APPLICATION FILED JUNE 12, 1911.
1,002,112.
Patented Aug. 29, 1911.
3 SHEETS—SHEET 3.
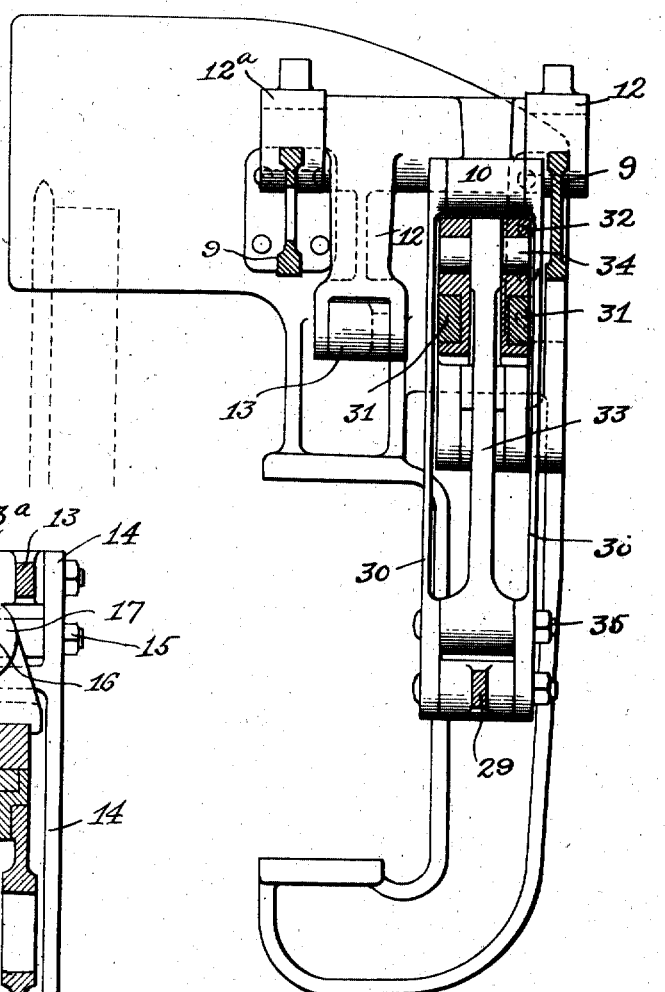
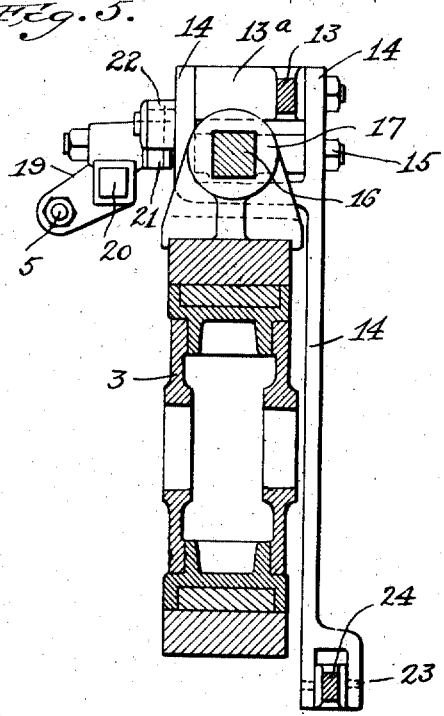

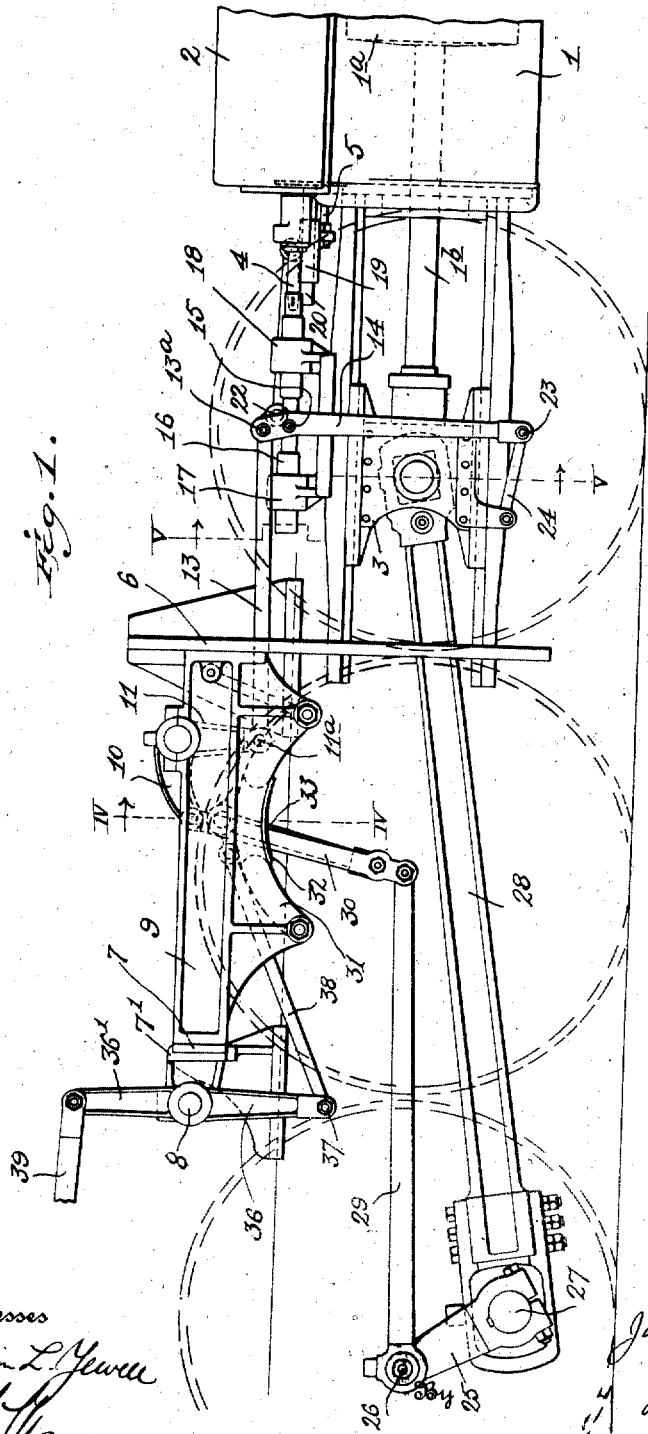

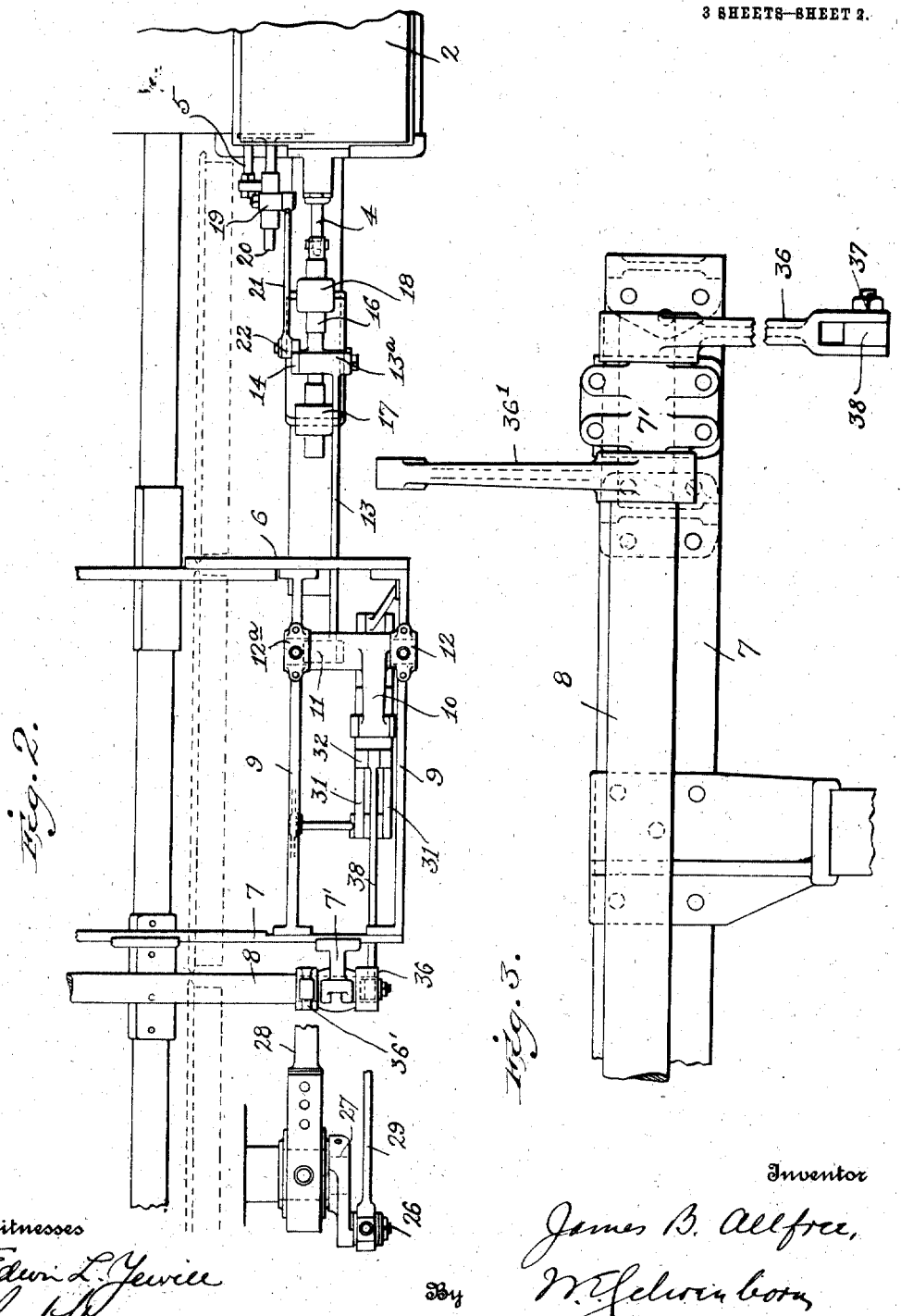

UNITED STATES PATENT OFFICE.

JAMES B. ALLFREE, OF CHICAGO, ILLINOIS.

VALVE-GEAR.

1,002,112. Specification of Letters Patent. Patented Aug. 29, 1911.

Application filed June 12, 1911. Serial No. 632,726.

*To all whom it may concern:*

Be it known that I, JAMES B. ALLFREE, a citizen of the United States, residing at Chicago, in the county of Cook and State of Illinois, have invented certain new and useful Improvements in Valve-Gear, of which the following is a specification.

My invention relates to outside gear of the radial type for operating a main distribution valve, or in combination therewith of a compression controlling valve of a steam, air, gas or other fluid pressure motor and is more especially designed and adapted for use upon locomotive engines of the type shown for example in my former U. S. Patent No. 770,671, dated September 20, 1904.

The object of my invention is to produce a simple, economical and reliable gear of the kind above referred to for securing an equal, most efficient, and ideal distribution of the motive fluid, by having the proper admission, quick cut-off, late release, minimum back-pressure, and least sufficient compression, under all conditions, to produce a maximum and uniform effective turning effort with a minimum consumption of motive fluid.

Further objects are, first, to have a simplified construction which consists of fewer working parts and has no open links or link blocks, and the joints used have large pins which are easily accessible and lubricated, whereby the cost of installation and maintenance are reduced to a minimum; second, to have the parts of the gear so arranged and constructed that the resistance incidental to reversing and changing of the cut-off does not come against the reverse lever, whereby the vibration found in other types of gears, is entirely eliminated; third, the eccentric rod connections are at or substantially in a horizontal plane passing through the center of the axle, and hence the movement of the engine on its springs can have no disturbing effect on the cut-off, and the valves are easily set and once square, remain so under all conditions; fourth, to so construct, proportion and arrange the moving parts that they are standardized for any type of engine, except the eccentric rod and combination lever must be adjusted in length to harmonize with the stroke of the piston, and the moving parts of the reversing or primary gear are so arranged and supported from a frame independent of the engine, that the said frame may be adjusted and secured in any position on the engine without being required to reconstruct or rearrange the engine body, cylinders, or valves; fifth, to construct and arrange the parts so that the forces for shifting and actuating the valve gear are practically in the same vertical plane or alinement, and uniformly balanced in large bearings, and the number and weight of the rapidly moving parts during operation are reduced to a minimum, thereby eliminating the objectionable inertia forces common in other gears heretofore used; sixth, to so offset the main and compression controlling valve connections with the combination lever, as to equalize the preadmission and compression for both ends of the cylinder and at the same time properly preserve the events of both valves; and, seventh, to provide a valve gear which has not only simplicity, perfect alinement and balance, together with few parts, accessibility and excellent steam distribution, but at the same time, low cost of manufacture, and applicable to any type of cylinder with an increased efficiency, endurance, and low cost of maintenance.

The last and primary object of my invention is to have a straight line movement of the combination lever instead of having a curved or arc movement, as in previous constructions, when the combination lever is hung from a bell crank or rocker arm. It has been found in practice when the combination lever was hung upon the bell crank, it was inaccessible, and some times created considerable trouble in application, and in case of repairs, required the removal of too many parts in order to reach the part affected.

While the above stated and correct valve events may be kept practically the same, a straight line or detached method, as shown in the present invention, is much easier of adjustment, for the reason that when the combination lever is hung upon a bell crank, a combination of arcs or curves are produced, that require greater accuracy to adjust, for the reason that the relation of both must be absolutely the same and exact, whereas in the straight line movement being detached, an error can at once be detected as to the part in error, whether the error is in the combination lever or in the bell crank. A further advantage of the straight line or detached motion is that there is much less inertia of the rapidly reciprocating parts to be taken into consideration, and less vibration created in the reverse gear mechanism. In the case where the combination lever is hung directly upon the bell crank, notwithstanding my method, as shown and described in my companion application, Serial No. 592,041, filed Nov. 12, 1910, for destroying the vibration or danger caused by the vibration of the reverse lever at excessively high speeds, some slight vibration was found; whereas, in the straight line or detached method, as herein shown, the higher speed does not appear to affect the same; in fact, the tendency appears to be better as the speed goes up. There is also an especial advantage in the application of the present form of gear to old engines, as a much nearer approach to the common and universal construction is had with the present detached motion. It is stronger and wears better and much easier on the valve stem, and less liable to accidents, and where the gear is applied to my system of steam distribution, the connection between the combination lever and the compression controlling valve is much shorter, eliminating entirely the danger arising through too much inertia, especially when parts are made heavy enough to avoid undue vibration.

To this end my invention consists in the novel features of construction, arrangement and combination of elements herein shown and described and more particularly pointed out in the claims.

In the accompanying drawings wherein the same reference characters indicate the same parts in the several figures of the drawings: Figure 1 is a side elevation of my invention; Fig. 2 is a plan view; Fig. 3 is an enlarged view of the reversing lever connections; Fig. 4 is an enlarged sectional view taken on line IV—IV of Fig. 1; and Fig. 5 is a similar view taken on line V—V of Fig. 1.

In the drawings, for the purpose of illustration, I have shown my invention as applied to a locomotive in which 1 is the cylinder provided with the piston $1^a$ and piston rod.

2 is a steam chest of the usual form, if desired, or of the construction as indicated in my prior Patent No. 770,671, dated Sept. 20, 1904, and herein referred to and showing in addition to a main valve, a compression controlling valve and needs no further disclosure.

3 represents the usual cross-head connection with the piston rod $1^b$, and piston $1^a$ in the cylinder 1, and 4 is the main valve stem while 5, the compression controlling valve stem connects with the compression regulating valve, (not shown) in the steam chest.

6 is the usual guide yoke and 7' the bracket for supporting the reversing shaft 8.

The standardized and independently adjustable supporting frame 9 is mounted jointly on the yoke 6 and bar 7 and serves the purpose of a support for my form of reversing or primary gear mechanism. A rocker or bell crank having arms 10 and 11, is pivotally mounted upon the frame 9, in bearings 12, and $12^a$, with the arm 11 extending downward and its extremity pivotally attached at $11^a$ to one end of a rod 13, which is pivotally connected at its other end $13^a$ to a combination lever 14, said combination lever 14 being pivotally secured by means of a pin 15 to a rod 16 slidably supported by reciprocating through square holes in the bearings 17 and 18, firmly supported on the top of the cross head guide as indicated. The main valve stem 4 is preferably keyed or suitably connected to the outer end of the sliding or reciprocating rod 16, but it may be attached to any suitable part of the upper end of the combination lever, in order to receive its reciprocating motion, without departing from the invention, while the compression regulating valve stem 5 is connected to a sleeve 19, which is properly reciprocated on a square bar 20 secured to the cylinder head, by means of rod 21, pivotally connected to said sleeve 19 and at 22 near the upper end of the combination lever, as shown in Figs. 1, 2 and 5. The lower end of the combination lever 14, is pivotally connected at its lower end at 23, by means of a link 24 to the cross-head 3.

The center of the pivot pin 15 at which the combination lever 14 is pivotally supported on the reciprocating rod 16, is off-set from a line passing through the center of the pivotal connection of the rod 13, with the combination lever 14, and the point 23, for the purpose of properly preserving and equalizing the events of the main valve at both ends of the cylinder, and squaring up the pre-admission. Furthermore, the points of connection 15, and 22, of the main and compression valves with the combination lever 14, are so arranged and related to each other, that the compression valve stem 5 always lags behind the movement of the main valve stem 4, so that after the main valve is closed to the exhaust, when the arrangement as shown in my Patent No. 770,671, is used, the compression controlling valve is still open, and only closes at such a time as will insure sufficient and minimum compression for the smooth operation of the engine.

While I have shown and described the use of a compression controlling valve, I do not care to limit myself to this combination only, but also to the combination described, independent of the said compression controlling valve. An auxiliary or eccentric crank 25, with a crank pin 26 is mounted upon the main crank pin 27 of the locomotive, said pin 27 being connected with the cross-head 3, by the usual connecting rod 28, and connected by an eccentric rod 29 to the lower ends of a divided transmission bar 30, 30, the ends of said bar being pivotally connected to the arm 10, of the rocker near its extremity.

The several parts just described are preferably so proportioned and arranged that when the crank pin 26 is at mid-stroke vertically, the eccentric rod 29, will be substantially horizontal and when the pin 26 is at mid-stroke horizontally, the transmission bars 30, 30, will be in a substantially vertical position.

Any suitable means may be provided for supporting and controlling the movements of the transmission bars 30, 30, but I have found the best manner, and my preferred form as shown, which comprises curved radius guide bars 31, 31, which are suitably separate and rigidly attached near their ends to the supporting frame 9, by bolts or otherwise, and pass between the transmission bars 30, 30, (see Fig. 4). A radius block 32 is mounted between and adapted to freely slide in the guide bars 31, 31. A radius bar 33 is pivotally and centrally connected at its upper end to the radius block 32, as at 34, and passes between the guide bars 31, 31, and at its lower end the bar 33 is pivotally attached, as at 35, to and between the two transmission bars 30, 30.

From this arrangement, it will be seen that there are no overhanging bearings and the actuating forces are uniformly distributed with respect to a central vertical plane passing through the eccentric rod 29, and hence no tendency to distort or twist any of the parts.

It will be observed that one end of the eccentric rod 29, and the transmission bars 30, 30, are supported upon the radius block 32, and that the movements of the parts may be modified by the position of the radius block 32 upon the guide bars 31, 31. For example, when the radius block 32 is positioned at the center of the guide bars 31, 31, the lower end of the transmission bars 30, 30, will merely swing backward and forward, however, if the radius block 32 is moved from its central position, a vertical movement is imparted to the upper end of the transmission bars 30, 30, which is communicated to the valve mechanism through the rocker or bell crank arms 10 and 11, to the rod 13, which in turn reciprocates the upper end of the combination lever 14, pivotally supported on the bar 16, slidably supported in the bearings 17 and 18, the resultant movement of the upper end of the combination lever 14, whose lower end 23 is oscillated by the cross-head 3, being transmitted to the valve stems 4 and 5.

Any suitable means may be provided for controlling the position of the radius block 32, upon the guide bars 31, 31, and in the form shown, a lever having arms 36 and 36', is mounted on the reverse shaft 8, with a crank pin 37 near the free and lower end of arm 36. A link 38 is pivotally connected at one end to the crank pin 37, and at its opposite end to the radius block 32. A suitable reach rod 39 is provided to connect the upper end of the arm 36' of the lever to the common and well known reverse lever in the cab, not shown.

It will be observed that in the mechanism herein described and shown in the drawings, by having the eccentric rod 29 substantially horizontal, or in a horizontal plane, passing through the axes of the driving wheels, any movement of the locomotive on its springs will not produce appreciable or injurious movement of the valves from the proper adjustment, and that as the eccentric rod 29 is moved by the crank 26, a swinging motion is imparted to the transmission bars 30, 30, and that as the radius block 32 is moved either way from its central position, a longitudinal movement is imparted to the rocker bar or bell crank arms 10 and 11, which is imparted to the reciprocating rod 16 of the valve operating mechanism and controls the cut-off, release, and closing of the main valve, while the movement of the combination lever 14, influenced by the cross-head movements, controls the lap and lead of the valve, the two above movements of the combination lever 14 acting simultaneously and each modifying the other, so as to produce and control the proper valve events, and secure efficient and ideal distribution of the steam in the cylinder by having proper admission, quick cut-off, late release, minimum back pressure, and proper and least compression under all conditions in a more simple and efficient manner, and without disturbing forces due to the movement of the locomotive on its supporting springs. Furthermore, by having the combination lever detached from the rocker or bell crank, and reciprocated in a straight and fixed line, instead of a combination lever of arc movement, the inertia of the moving parts is reduced and enables one, as fully stated in the statement of invention, to quickly detect and accurately correct any inaccuracies of construction and adjustment. Furthermore, in the form shown it will be seen, that if the radius block 32 is moved forward of its central position, the engine will move forward, and if it is moved backward of the center, the engine will be reversed, or move backward. It is obvious on examination of the construction and relation of the radius guide bars, radius block, radius bar, transmission bar, and eccentric rod, that the resultant force or stress produced when the valve gear is in operation, is so applied to the radius block as to be substantially normal to the curvature of the guide bars, and hence there is very little or no tendency to move the radius block upon the guide bars, thus practically eliminating all of the dangers common to valve gears that rely upon the reverse lever to resist the disturbing forces of the rapidly moving valve, and gear parts.

It is obvious that various immaterial modifications may be made in my device without departing from the spirit of my invention, hence I do not wish to be understood as limiting myself to the exact form or construction shown.

What I claim:—

1. A valve gear comprising a cross head, an eccentric rod, a rocker or bell crank, a movable support, a combination lever having one end pivotally connected to said movable support, and its other end connected to the cross head, a rod connecting one arm of the rocker or bell crank to the upper end of the combination lever, means for connecting a main valve to said movable support, a transmission bar having one end pivotally connected with the other arm of the rocker or bell crank and its other end to the eccentric rod, a radial guide bar, a radius block slidably supported on said radial guide bar, a radius bar pivotally connected at one end to the radius block and at its other end with the end of the transmission bar connected to the eccentric rod, and means for shifting the radius block on said guide bar.

2. A valve gear comprising a cross head, an eccentric rod, a rocker or bell crank, a reciprocating support, a combination lever having one end pivotally connected to said reciprocating support, and its other end connected to the cross head, a rod connecting one arm of the rocker or bell crank to the upper end of the combination lever, means for connecting a main valve to said movable support, a transmission bar having one end pivotally connected with the other arm of the rocker or bell crank and its other end to the eccentric rod, a radial guide bar, a radius block slidably supported on said radial guide bar, a radius bar pivotally connected at one end to the radius block and at its other end with the end of the transmission bar connected to the eccentric rod, and means for shifting the radius block on said guide bar, said radial guide bar so interposed between the transmission bar and means for moving the radius block, as to have the resultant forces normal to the curvature of the guide bar, and thereby absorb the vibrations or inertia of the reciprocating parts.

3. A valve gear comprising a cross head, an eccentric rod, a rocker or bell crank, a sliding support, a combination lever having one end pivotally connected to said sliding support, and its other end connected to the cross head, a rod connecting one arm of the rocker or bell crank to the upper end of the combination lever, means for connecting a main valve to receive the motion of the sliding support, a transmission bar having one end pivotally connected with the other arm of the rocker or bell crank and its other end to the eccentric rod, a radial guide bar, a radius block slidably supported on said radial guide bar, a radius bar pivotally connected at one end to the radius block and at its other end with the end of the transmission bar connected to the eccentric rod, and means for shifting the radius block on said guide bar.

4. A valve gear comprising a cross head, an eccentric rod, a rocker or bell crank, a sliding support, a combination lever having one end pivotally connected to said sliding support, and its other end connected to the cross head, a rod connecting one arm of the rocker or bell crank to the upper end of the combination lever, means for connecting a main valve to said sliding support, a transmission bar having one end pivotally connected with the other arm of the rocker or bell crank and its other end to the eccentric rod, a radial guide bar, a radius block slidably supported on said radial guide bar, a radius bar pivotally connected at one end to the radius block and at its other end with the end of the transmission bar connected to the eccentric rod, and means for shifting the radius block on said guide bar, said radial guide bar so interposed between the transmission bar and means for moving the radius block, as to have the resultant forces normal to the curvature of the guide bar, and thereby absorb the vibrations or inertia of the reciprocating parts.

5. A valve gear comprising a cross head, an eccentric rod, a rocker or bell crank, a sliding support, a combination lever having one end pivotally connected to said sliding support, and its other end connected to the cross head, a rod connecting one arm of the rocker or bell crank to the upper end of the combination lever, means for connecting a main valve to said sliding support, means for connecting a compression controlling valve to said combination lever, a transmission bar having one end pivotally connected with the other arm of the rocker or bell crank and its other end to the eccentric rod, a radial guide bar, a radius block slidably supported on said radial guide bar, a radius bar pivotally connected at one end to the radius block and at its other end with the end of the transmission bar connected to the eccentric rod, and means for shifting the radius block on said guide bar.

6. A valve gear for engines comprising an eccentric rod moving substantially in a horizontal plane, a rocker or bell crank, a sliding support, a combination lever having one end pivotally connected to said sliding support, and its other end connected to a moving part of the engine, a rod connecting one arm of the rocker or bell crank to the upper end of the combination lever, means for connecting a main valve to said sliding support, a transmission bar having one end pivotally connected with the other arm of the rocker or bell crank and its other end to the eccentric rod, a radial guide bar, a radius block slidably supported on said radial guide bar, a radius bar pivotally connected at one end to the radius block and at its other end with the end of the transmission bar connected to the eccentric rod, and means for shifting the radius block on said guide bar.

7. A valve gear for engines comprising an eccentric rod, means for actuating said eccentric rod, an independent and adjustable supporting frame carrying a rocker or bell crank, a sliding support, a combination lever having one end pivotally connected to said sliding support, and its other end connected to a moving part of the engine, a rod connecting one arm of the rocker or bell crank to the upper end of the combination lever, means for connecting a main valve to said sliding support, a transmission bar having one end pivotally connected with the other arm of the rocker or bell crank and its other end to the eccentric rod, a radial guide bar, a radius block slidably supported on said radial guide bar, a radius bar pivotally connected at one end to the radius block and at its other end with the end of the transmission bar connected to the eccentric rod, and means for shifting the radius block on said guide bar.

8. A valve gear comprising a cross head, an eccentric rod, a rocker or bell crank, a movable support, a combination lever having one end pivotally connected to said movable support, and its other end connected to the cross head, a rod connecting one arm of the rocker or bell crank to the upper end of the combination lever, means for connecting a main valve to receive the motion of the upper end of the combination lever, a transmission bar having one end pivotally connected with the other arm of the rocker or bell crank and its other end to the eccentric rod, a radial guide bar, a radius block slidably supported on said radial guide bar, a radius bar pivotally connected at one end to the radius block and at its other end with the end of the transmission bar connected to the eccentric rod, and means for shifting the radius block on said guide bar.

9. In a variable cut-off valve gear for locomotives, the combination with the main frame, eccentric rod, slide valve and cross head, of a support mounted on the frame, a bell crank journaled on the support, a link connecting one arm of the bell crank to the forward end of the eccentric rod, a movable support, a combination lever fulcrumed on the movable support, a rod connecting the other arm of the bell crank to the movable support, means for connecting the valve to receive the motion of the upper end of the combination lever, a link connecting the cross head to the lever at a proportionally greater distance from the fulcrum of the combination lever than the connection of the valve, a member mounted on the support and adjustable thereon through an arc, a rocker pivotally connected at one end to the adjustable member and at the other end to the bell crank link, the radial distance from said first to said second pivotal connection of the rocker being equal to the radial distance of its first pivotal connection from the center of the arc of movement of the adjustable member, and means to adjust and establish the adjustable member at different points in the arc of its movement.

10. In a variable cut-off valve gear for locomotives, the combination with the main frame, eccentric rod, slide valve and cross head, of a support mounted on the frame, a bell crank journaled on the support, a link connecting one arm of the bell crank to the forward end of the eccentric rod, a movable support, a combination lever fulcrumed on the movable support, a rod connecting the other arm of the bell crank to the movable support, means for connecting the valve to receive the motion of the upper end of the combination lever, a compression controlling valve, means for connecting said compression controlling valve to the combination lever, a link connecting the cross head to the lever at a proportionally greater distance from the fulcrum of the combination lever than the connection of the valve, a member mounted on the support and adjustable thereon through an arc, a rocker pivotally connected at one end to the adjustable member and at the other end to the bell crank link, the radial distance from said first to said second pivotal connection of the rocker being equal to the radial distance of its first pivotal connection from the center of the arc of movement of the adjustable member, and means to adjust and establish the adjustable member at different points in the arc of its movement.

In testimony whereof I affix my signature in presence of two witnesses.

JAMES B. ALLFREE.

Witnesses:
C. M. CLAYTON,
J. R. WEEKS.